United States Patent [19]

Park

[11] Patent Number: 5,289,310
[45] Date of Patent: Feb. 22, 1994

[54] A FRAME LINE MEMORY CONTROL CIRCUIT AND METHOD FOR CONTROLLING STORAGE OF VIDEO DATA OF A VIDEO SIGNAL

[75] Inventor: Jung-Mok Park, Suwon City, Rep. of Korea

[73] Assignee: SamSung Electronics, Co. Ltd., Suwon, Rep. of Korea

[21] Appl. No.: 763,292

[22] Filed: Sep. 20, 1991

[30] Foreign Application Priority Data

Oct. 8, 1990 [KR] Rep. of Korea .................. 15937

[51] Int. Cl.⁵ .............................................. G06K 9/00
[52] U.S. Cl. ..................................... 358/443; 358/442
[58] Field of Search ............................. 358/442–443, 358/133, 138

[56] References Cited

U.S. PATENT DOCUMENTS

| | | | |
|---|---|---|---|
| 4,947,345 | 8/1990 | Paradise et al. | 358/442 |
| 5,077,810 | 12/1991 | D'Luna | 358/443 |
| 5,124,813 | 6/1992 | Minowa et al. | 358/442 |

*Primary Examiner*—Stephen Brinich
*Attorney, Agent, or Firm*—Robert E. Bushnell

[57] ABSTRACT

A circuit and method of controlling the write and read operations of video data onto a line memory without occurrence of any data collision between odd fields occurs with the line memory providing a thermal print head of a video printer with printing data, in a frame-by-frame printing system. The line memory is provided with a frame-by-frame reading and writing system upon storing the video data therein and upon providing printing data to a thermal print head of the video printer. The video data of a first odd field corresponding to a first line during a first odd field period and the video data of a first even field corresponding to the first line during a first even field period are written into the line memory. The video data of a second odd field corresponding to a second line during a second odd field period and concurrently thereto, a read out is enabled for the first odd and even field video data corresponding to the first line from the line memory to therefrom print out the corresponding video data in the video printer. The consecutive reading, writing, and printing steps are repeated until completing all the scanning lines on a single video screen.

20 Claims, 7 Drawing Sheets

A FRAME LINE MEMORY CONTROL CIRCUIT AND METHOD FOR CONTROLLING STORAGE OF VIDEO DATA OF A VIDEO SIGNAL

BACKGROUND OF THE INVENTION

The present invention relates generally to controlling a memory in a video printer and in particular, to a method and circuitry for controlling the memory by adopting a frame line reading and writing system upon supplying printing data to a thermal print head of the video printer.

Figure 2:
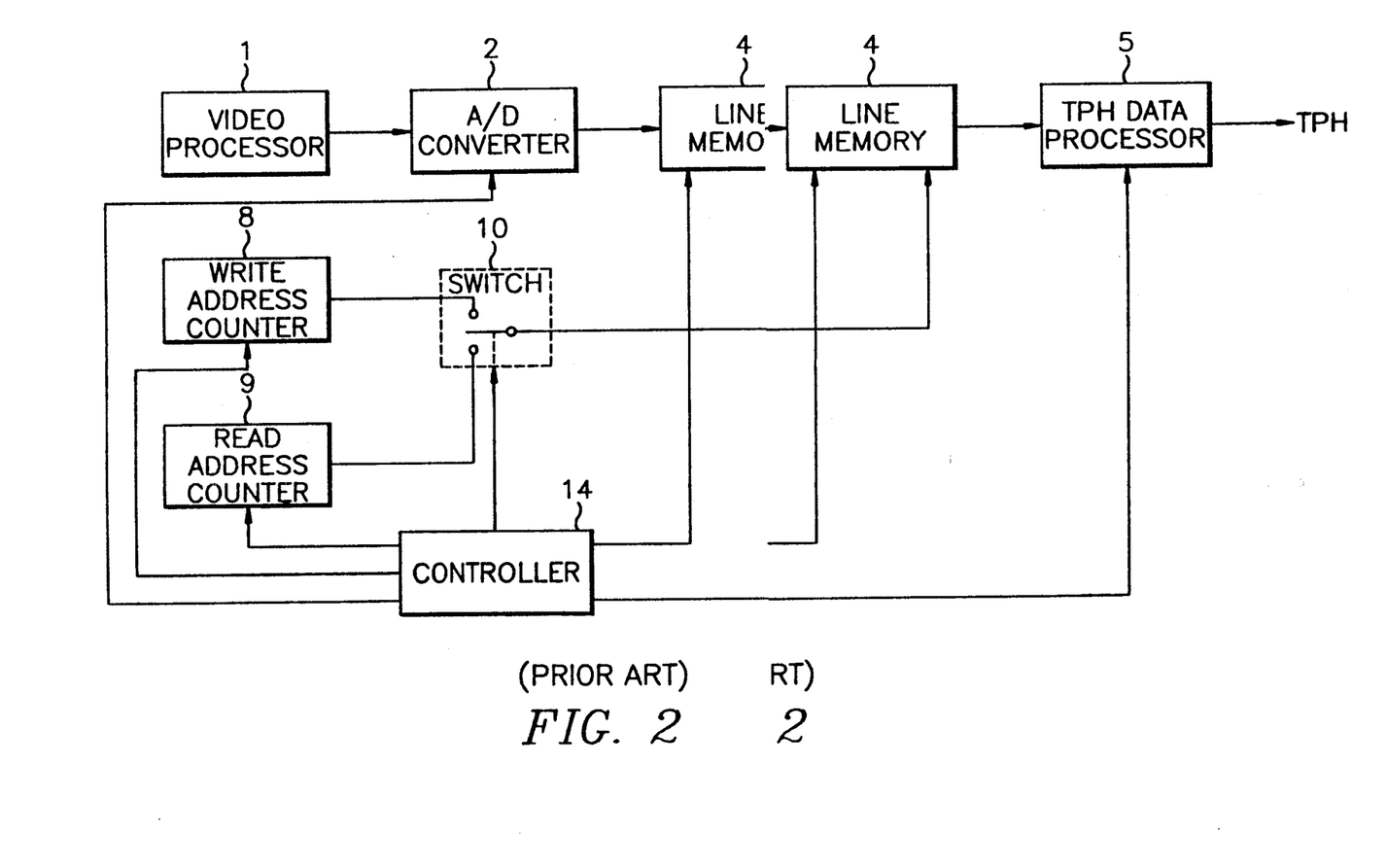
FIG. 2 is a schematic block diagram of the one of known arts for controlling a line memory providing a thermal print head with printing data in a video printer, in a field line system.

One of known arts for controlling a line memory providing a thermal print head (TPH) with printing data in a video printer is a field line system, a schematic block diagram of which system is disclosed in FIG. 2. Referring to this system, during a writing operation of printing data into a line memory 4, a controller 14 generates a given write address by controlling a write address counter 8, and a switch 10 transfers the write address from the write address counter to the line memory 14 under control of the controller 14. Hence, once analog video data from a video processor 1 are converted to digital data in an analog-to- digital converter 2 under control of the controller 14, the digital data are then supplied to the corresponding write address of the line memory 4 and stored therein as printing data for use in a subsequent printing operation of the video printer.

When reading the stored printing data out of the line memory 4 upon a printing operation, the switch 10 is connected to a read address counter 9, which under control of the controller 14 generates a set of read address to therefrom retrieve a corresponding one of the printing data previously stored in designated memory 4 allocations within the line memory, thereby transferring the read address to the line memory 4. Thus, a thermal print head (TPH) data processor 5 operably connected with the controller 14 and the line memory 4 receives the printing data read out of the line memory and, under control of the controller 14, provides the received data to a thermal print head (TPH) driver (not shown in the drawing) after processing a kind of conversion of printing data for better application in the TPH driver.

Figure 1:
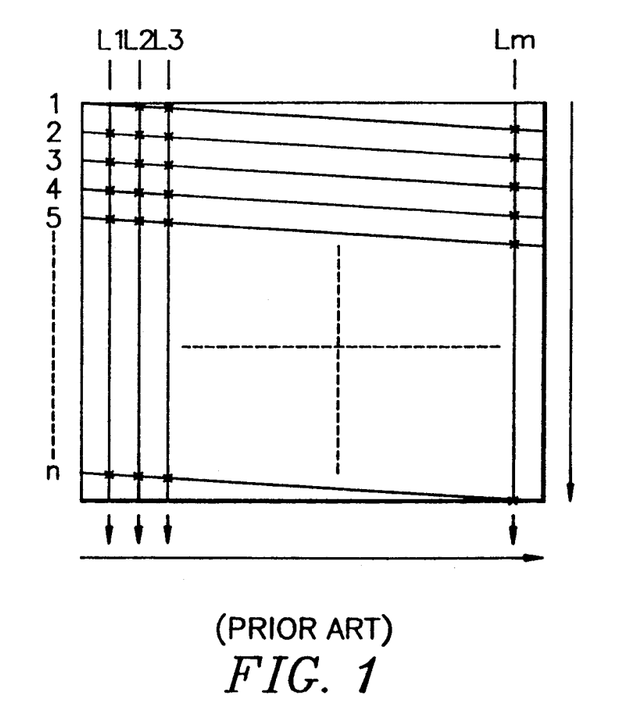
FIG. 1 illustrates the correlation between scanning of video data on a video screen and sampling of the video data to be stored into the line memory, by way of example, in view of the state of the art.

FIG. 1 illustrates the correlation between scanning of video data on a video screen and sampling of the video data to be stored into the line memory, by way of example, in view of the state of the art. Referring to this correlation, the video data on a single video screen are sampled and stored line by line into the line memory, and the stored video data are printed line by line, as follows:

1st line printing:   $(1, L_1), (2, L_2), (3, L_1) \ldots (n, L_1)$
2nd line printing:   $(1, L_2), (2, L_2), (3, L_2) \ldots (n, L_2)$
.
.
.
m-th line printing:  $(1, L_m), (2, L_m), (3, L_m) \ldots (n, L_m)$ wherein, n and m are respectively integer designations giving the maximum location of the video data scanning and sampling, and $L_1$ through $L_m$ each designate a corresponding memory line in the line memory.

Figure 3:
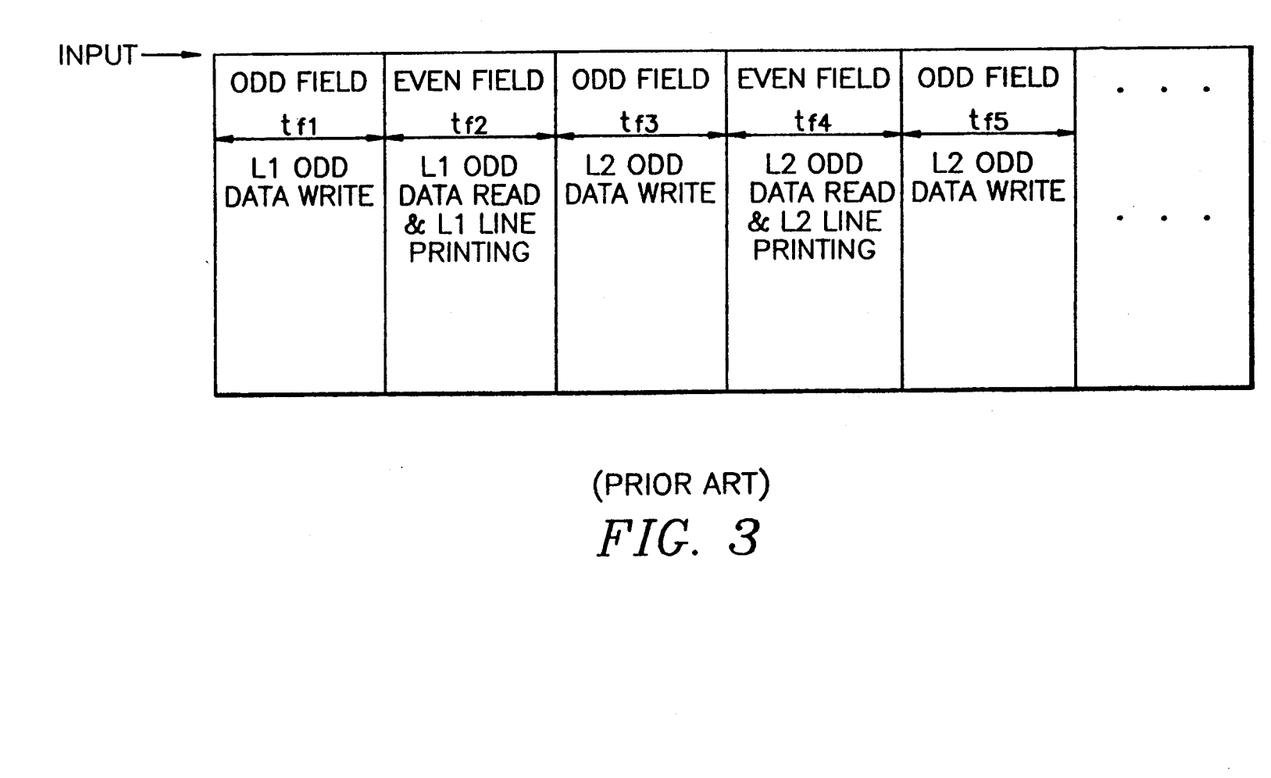
FIG. 3 is a schematic diagram for illustrating the correlation of consecutive read and write operations onto the line memory in the field line system, as shown in FIG. 2.

FIG. 3 is a schematic diagram for illustrating the correlation of consecutive read and write operations onto the line memory in the field line system, as shown in FIG. 2, provided with a repetition of one odd field and one even field of an input video signal. In this context of such a field line printing system every field of the input video signal is sequentially taken into the line memory by an interlacing scanning and sampling method. A common phenomenon of data collision occurs between odd fields such as a third field, a fifth field, a seventh field, etc., since the line memory is provided with only one input/output port in the usual cases. This data collision inevitably leads to poor picture quality in printing. Furthermore, while the line memory is usually adapted to store only video data corresponding to a single line to print out, it often fails to provide economical memory usage since nearly all commercially supplied memory devices do not fit such small sized line memory.

A U.S. Pat. No. 4,819,008 to Nagato et al. discloses a thermal print head driver circuit for a thermal printer permitting multiple graduation printing.

SUMMARY OF THE INVENTION

It is therefore an object of the invention to provide a circuit and method capable of controlling the write and read operations of video data onto a line memory without occurrence of any data collision between odd fields, the line memory providing a thermal print head of a video printer with printing data, in a frame line printing system.

To achieve the above object and other advantages of the present invention, a preferred embodiment of the present invention having a line memory storing video data, includes:

a controller generating a multiplicity of control signals;

an analog/digital conversion means for converting an analog video signal from a video processor to corresponding digital video data under control of a first control signal from the controller;

latch means for temporarily storing the video data from the conversion means during a printing operation;

memory means for writing said video data and reading out same upon request from the controller, the memory means comprising the line memory;

a first switching means connectable to the conversion means and the latch means, for selectively transferring the video data from either one of the conversion means and the latch means to the memory means, under control of the controller;

a write address counter means for providing a given write address to store the video data to the memory means under control of the controller;

a first logic gate means for producing a first gate control signal to enable the operation of the latch means and the write address counter means;

a read address counter means for providing a given read address to retrieve the video data out of the memory means under control of the controller;

a second logic gate means for producing a second gate control signal;

a second switching means connectable to the read address counter means and the write address counter means, for selectively providing either one of the read address and the write address to the memory means in dependency of the second gate control signal from the second logic gate means; and a third switching means connectable to the write address counter means, for transferring a selected one of the write addresses from the write address counter means to the second switching means under control of the controller.

BRIEF DESCRIPTION OF THE DRAWINGS

A more complete appreciation of the invention, and many of the attendant advantages thereof, will be readily enjoyed as the same becomes better understood by reference to the following detailed description when considered in conjunction with the accompanying drawings in which like members indicate the same or similar components, wherein:

FIGS. 5A to 5E, and 6A to 6E each are waveform diagrams showing every operation sequence in parts of the embodiment circuitry disclosed in FIG. 4.

DETAILED DESCRIPTION OF THE PREFERRED EMBODIMENT

Figure 4:
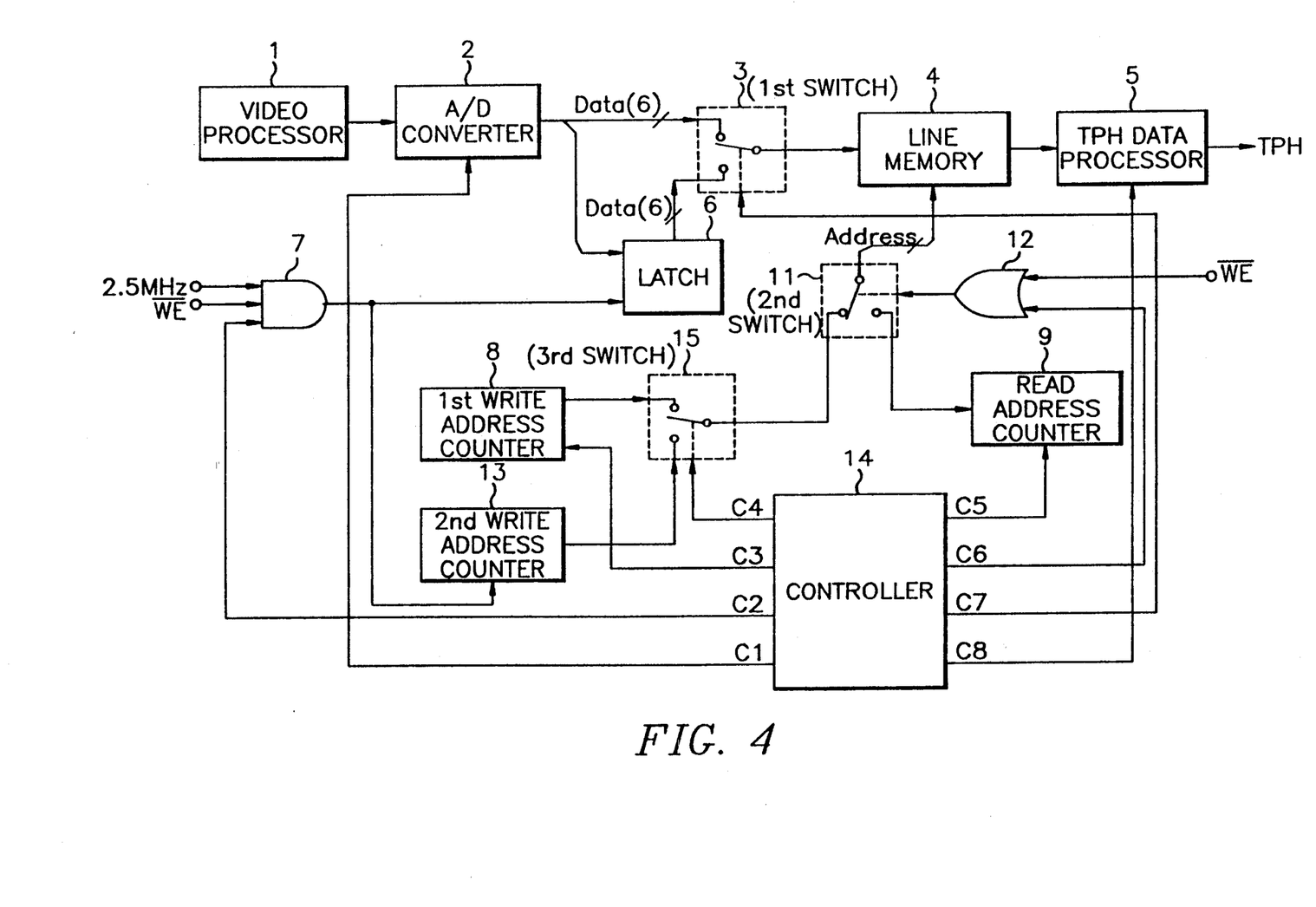
FIG. 4 is a block diagram showing a preferred embodiment of a line memory control circuit according to the present invention.

Referring to FIG. 4, the preferred embodiment of a line memory control circuit of the invention, a line memory 4 stores video data to print line by line in a video printer, the line memory provided with a frame-by-frame reading and writing system upon storing said video data therein and upon providing printing data to a thermal print head of the video printer. A thermal print head (TPH) controller 14 generate a multiplicity of control signals. An analog/digital converter 2 converts an analog video signal from a video processor 1 to corresponding digital video data under control of a first control signal from the controller 14. A latch 6 temporarily stores the video data from the converter 2 during a printing operation. Line memory 4 writes the video data and reads out the same upon request from the controller 14, where the video data corresponds to each line printing out in the video printer. A first switching circuit 3 is connected to the converter 2 and the latch 6, for selectively transferring the video data from either one of the converter and the latch to the line memory 4, under control of the controller 14. A write address counter stage includes a first write address counter 8 providing a write address during non-printing sequence and a second write address counter 13 providing a write address during a printing sequence. The write address counter means provides a given write address to store the video data to the line memory control of the controller. An AND gate 7 receives a 2.5 MHz clock signal, a write enable signal (WE) and a second control signal C2 from the controller 14, for produces a first gate control signal to enable the operation of the latch 6 and the second write address counter 13. A read address counter 9 is connected to the controller for providing a given read address to retrieve the video data out of the line memory under control of the controller. An OR gate 12 receives the write enable signal and a control signal C6 for producing a second gate control signal. A second switch 11 is connected to the read address counter 9 and a third switch 15, for selectively providing either one of the read address and the write address to the line memory in dependency of the second gate control signal from the OR gate 12. The third switch 15 is connected to the first and second Write address counters 8 and 13, for transferring a selected one of the write addresses from one of the write address counters to the second switch 11 under control of the controller. A thermal print head data processor 5 is connected to the line memory, for performing a conversion process to enable a better matching of the video data in the thermal print head (not shown), under control of said controller.

FIGS. 5A to 5E, and 6A to 6E are waveform diagrams showing every operation sequence in parts of the embodiment circuitry disclosed in FIG. 4. In the diagrams, a waveform 5A shows a print enable signal, a waveform 5B shows a vertical synchronizing signal, a waveform 5C shows a control signal C7 from TPH controller 14, a waveform 5D shows another control signal C3 or C4, and a waveform 5E shows an odd-/even decision signal which is at logic high level for an odd field and at logic low level for an even field. Further in the waveform diagrams, a waveform 6A shows a horizontal synchronizing signal, a waveform 6B shows an exemplar output in every gradation read out of the line memory 4 upon printing, a waveform 6C shows a timing pulse generated at every fourth horizontal synchronizing signal, a waveform 6D shows a write enable signal applied into the line memory upon printing and is enlarged to correspond to one pulse duration of the waveform 6C, and a waveform 6E shows an address timing signal for the line memory during the write enable duration.

Figure 7:
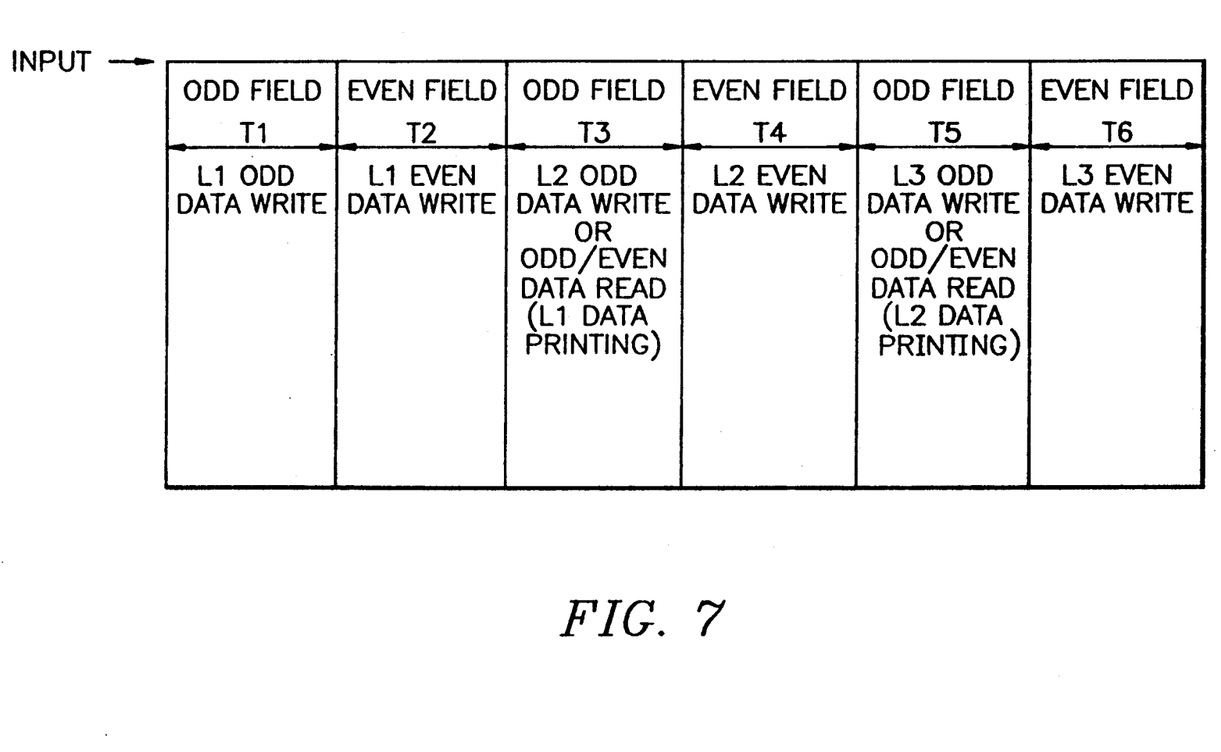
FIG. 7 is a schematic diagram similar to that of FIG. 3, for describing the correlation of consecutive read and write operations onto the line memory in the preferred embodiment circuit of the present invention as shown in FIG. 4.

FIG. 7 is a schematic diagram similar to that of FIG. 3, for describing the correlation of consecutive read and write operations onto the line memory and the printing operation to the input video signal according to the preferred embodiment as shown in FIG. 4. Each symbol T1, T2, T3, etc. designates one vertical period, namely each field as even or odd.

Upon a data write operation into the line memory 4, the first write address counter 8 is operated under control of the TPH controller 14 in order a series a write address, in particular, a series of odd numbered addresses to the line memory, when the controller directs the first switch 3 to select the upper contact. Hence, the analog video input signal from the video processor 1 is converted into a digital video signal in the A/D converter 2 under control of the controller, and through the first switch 3, is delivered to the line memory 4 so that the video signal is finally written into the corresponding address location of the line memory.

The video signals supplied to the line memory are taken in a repeating sequence of an odd field and thereafter an even field. Based upon the above-mentioned write address, video data of an odd field corresponding to a scanning line L1 of FIG. 1 are first sampled and stored into the line memory as printing data, which is carried out during a period T1 in FIG. 7. Then, during a period T2, the first address counter 8 provides the line memory with another write address, that is, a series of even addresses, while since the first switch maintains its state, video data of an even field corresponding to the scanning line L1 are secondly sampled and stored into the line memory.

Figure 6:
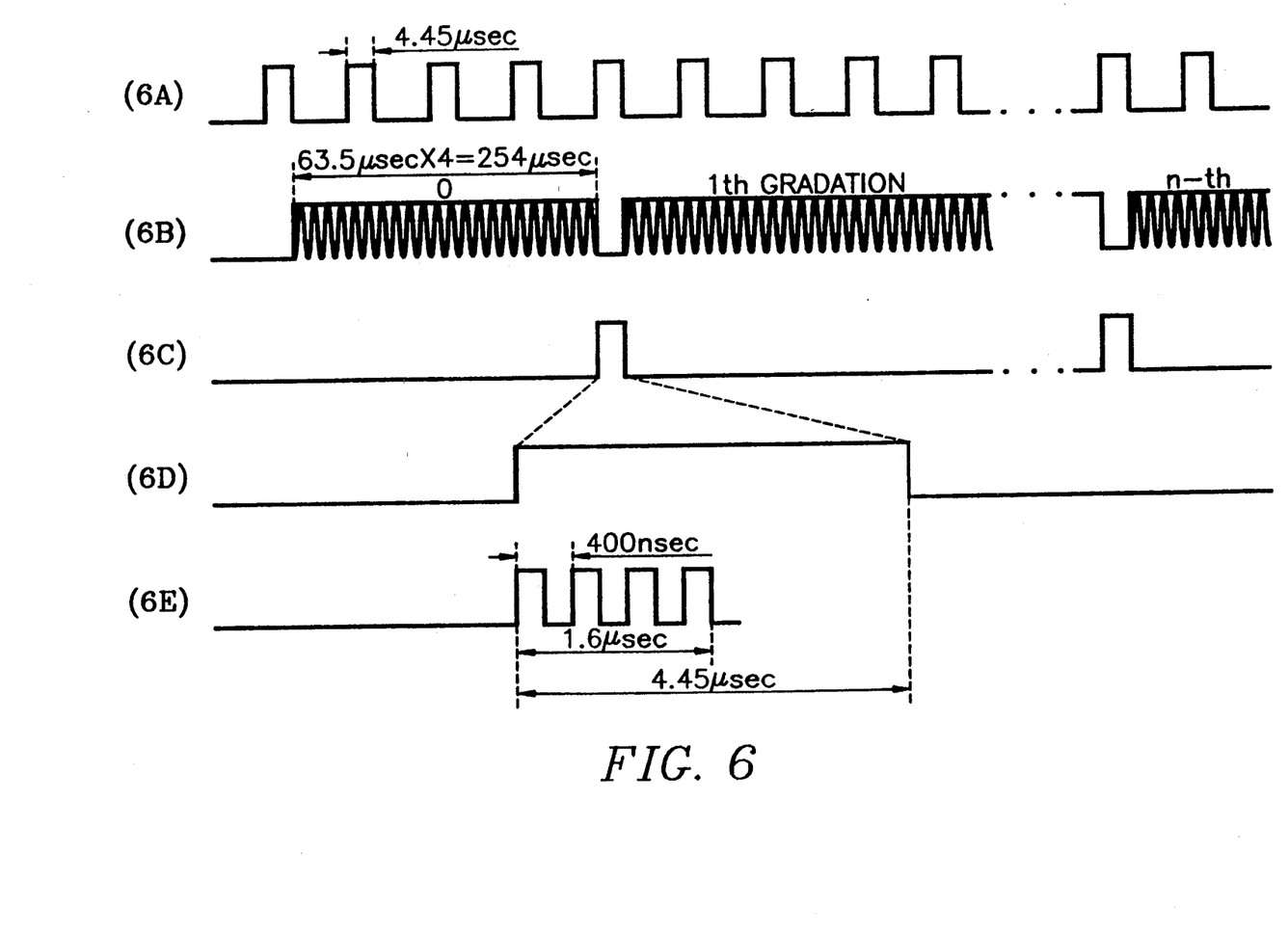

During a period T3, both the printing and writing operations are performed simultaneously. In case the video data stored in the line memory are read out to be printed in the TPH, gradation of printing is first checked. For example, in the preferred embodiment circuit, a number of horizontal synchronizing pulses within a single vertical period is 262.5 and the pulse width thereof is 4.45 $\mu$-sec (in 9 NTSC system), as seen by FIGS. 6A and 6B. Here, assuming that the gradation of printing is 64 steps and a frequency of an input clock signal to the write address counter is 2.5 MHz, a time needed for one gradation may be 0.4 $\mu$-sec * 512 = 204.8 $\mu$-sec, wherein the number 512 correspond to a given even address in the line memory. Hence, the read address counter 9 provides the addresses 0–512 to the line memory at 64 times, thereby enabling the printing of the video data corresponding to the line L1. Concomitant with this printing operation, the video data of an odd field corresponding to a Line L2 are to be sampled and stored into the line memory. At this time however, occurrence of data collision should be prevented. To achieve this, a write address is to be provided to the line memory within a time duration of a horizontal synchronizing pulse signal just following the performance of one gradation, which time duration substantially means a "write enable period upon printing". The second write address counter 13 operates during a time duration of logic high of a "write enable signal upon printing", shown in FIG. 6D, designating the write enable period upon printing, thereby providing the corresponding addresses 515, 517, 519, . . ., 1021, 1023 to the line memory.

Figure 5:
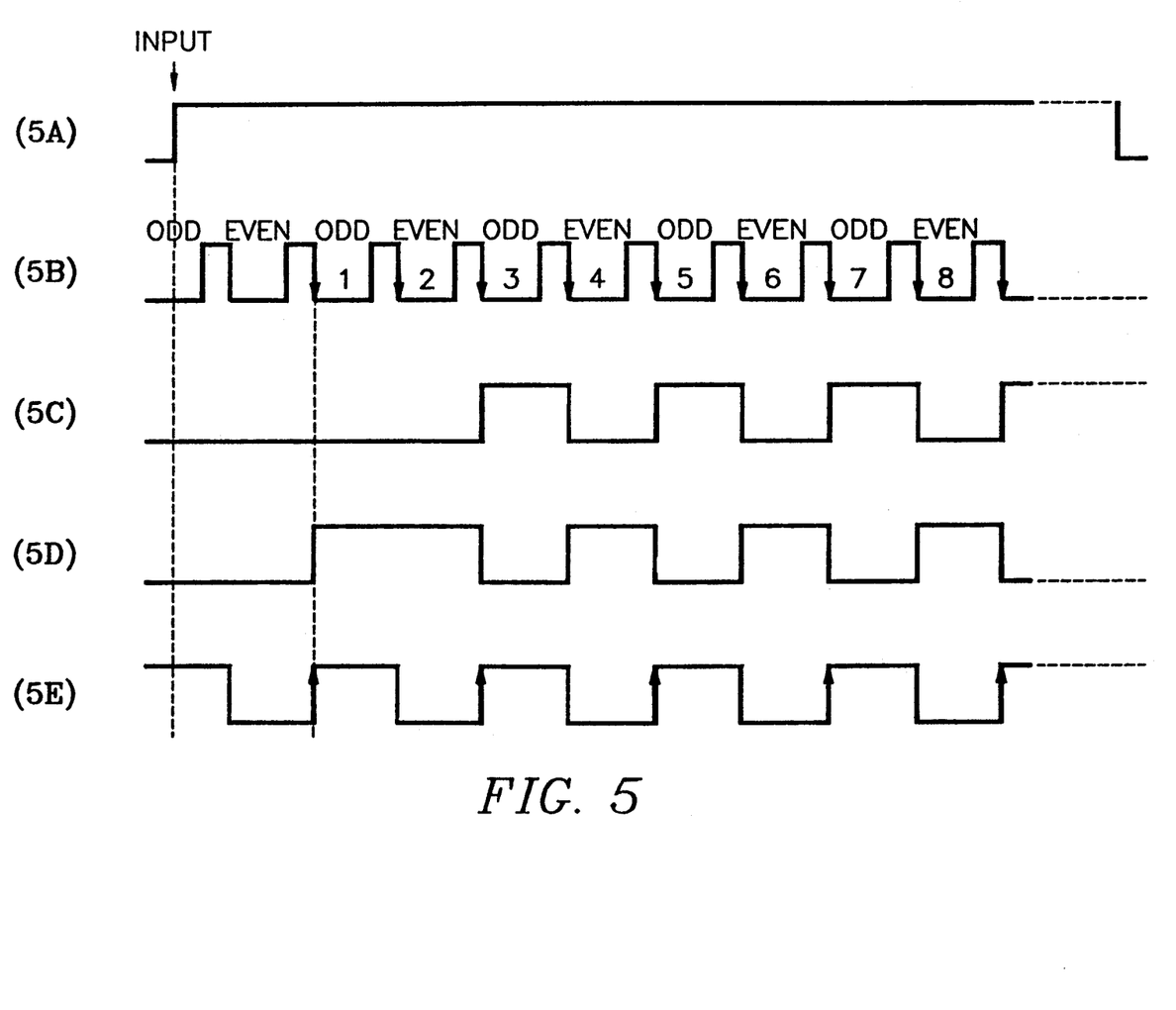

In the meanwhile, the latch 6 temporarily stores four sets of video data of six bits attendant in four time intervals of the horizontal synchronizing signal, which video data is transferred from the latch to the line memory in synchronism with a 2.5 MHz clock signal and logic high durations of the second control signal, i.e., a clock signal of FIG. 5C. This sequence of operation enables the storage of four sets of video data per gradation into the line memory, resulting in 9 total of 256 lines of video data. At this time, the first switch 3 is switched over to the other contact position, thereby enabling the transfer of digital video data from the latch to the line memory. The operation of both the second write address counter 13 and the latch 6 are dependent upon an output of the AND gate 7 receiving a 2.5 MHz clock signal, the write enable signal upon printing and the C2 control signal from the controller, wherein all three high inputs to the AND gate will enable the foregoing operation of the latch.

During the period T4 of FIG. 7, the video data of an even field corresponding to line L2 are sampled and then stored into the line memory. Thus the first write address counter 8 is enabled to provide the corresponding write addresses 516, 518, 520, . . ., 1022, 1024 to the line memory. At this time the first switch 3 is switched to transfer the video data from the A/D converter to the line memory 4 under control of the controller 14. This operation is substantially carried out during the time duration shown by a reference numeral 4 of the FIG. 5B waveform.

Then, during a period T5, the video data corresponding to the line L2 stored in the line memory are printed out and simultaneous to this printing operation, the video data of the odd field corresponding to a line L3 are further sampled and stored into the address locations 1, 3, 5, . . ., 511, 513 of the line memory.

Subsequent to the period T5 operation, the reading, writing and printing operations for remaining periods, which are similar to the foregoing ones, will be repeated until reaching the last period for line Lm.

As is understood from the foregoing description with reference to the attached drawings, the inventive circuit enables reading and writing of data without data collision upon printing, owing to effective use of the write enable periods in a line memory of a video printer. This greatly improves the video resolution of the video printer since it enables the frame line printing system in the video printer, as well as providing economical memory usage for the line memory.

While the foregoing provides a full and complete disclosure of the preferred embodiments of the present invention, various modifications, alternate constructions and equivalents thereof may be employed without departing from the true spirit and scope of the invention. Therefore, the above description and illustration should not be construed as limiting the scope of the invention, which is defined by the appended claims.

What is claimed is:

1. A frame line memory control circuit for controlling a frame line memory for storing video data, the control circuit comprising:

a controller generating a multiplicity of control signals;

analog-digital conversion means for converting an analog video signal from a video processor to corresponding digital video data;

latch means for temporarily storing said video data from said conversion means during printing operations;

memory means comprising said line memory for storing said video data and providing said video data upon request from the controller;

first switching means connectable to said conversion means and said latch means, for selectively transferring said video data from one of said conversion means and said latch means to said memory means, said first switching mean being under control of said controller;

write address counter means for providing a write address to store said video data in said memory means under control of said controller;

first logic gate means for producing a first gate signal to enable operation of said latch means and said write address counter means;

read address counter means for providing a read address to retrieve said video data from said memory means, said read address counter means being under control of said controller;

second logic gate means for producing a second gate signal;

second switching mans connectable to said read address counter means and said write address counter means, for selectively providing one of said read address and said write address to said memory mean in dependence upon said second gate signal from said second logic gate means; and a third switching means connectable to said write address counter means, for transferring a selected one of said write addresses from said write address counter means to said second switching means, said third switching means being under control of said controller;

whereby writing and reading operations of the video data in the memory means are carried out line by line.

2. The circuit as set forth in claim 1, further comprised of a thermal print head data processor connectable to said memory means, for performing a conversion process to enable matching of the video data in thermal print head, said thermal print head data processor being under control of said controller.

3. The circuit as set forth in claim 1, wherein said write address counter means comprises a first write address counter providing a write address during a non-printing sequence and a second write address counter providing a write address during a printing sequence.

4. The circuit as set forth in claim 3, wherein said first logic gate means comprises an AND gate receiving a clock signal and a write enable signal and said AND gate is under control of said controller.

5. The circuit as set forth in claim 4, wherein said second logic gate means comprises an OR gate receiving said wire enable signal and said OR gate is under control of said controller.

6. A method for controlling a frame line memory for storing video data, said method comprising the steps of:
writing into said frame line memory, video data of a first odd field corresponding to a first line during a first odd field period;
writing into said frame line memory, video data of a first even field corresponding to the first line during a first even field period;
writing into said frame line memory, video data of a second odd field corresponding to a second line during a second odd field period, and concurrently enabling reading of the first odd field video data and the firs even field video at a corresponding to the first line from said line memory; and
repeating said consecutive writing steps for all scanning lines of a single video screen.

7. A frame line memory control circuit for controlling storage of video data of a video signal, said circuit comprising:
first memory for storing odd field data and even field data corresponding to a first line of said video data and odd field data and even field data corresponding to a second line of said video data;
second memory for storing the odd field data corresponding to the second line prior to the odd field data corresponding to the second line being store din the first memory;
first switching means for transferring said odd field data corresponding to the first line to the first memory, then transferring said even field data corresponding to the first line to the first memory, then transferring said odd field data corresponding to the second line from the second memory to the first memory, then transferring said even field data corresponding to the second line to the first memory, said transferring of the odd field data corresponding to the second line occurring in dependence upon a fourth pulse of a plurality of pulses of a horizontal synchronizing signal of said video signal, said fourth pulse occurring between reading gradations of said odd field data corresponding to the first line and said even field data corresponding to the first line of video data stored in the first memory.

8. The frame line memory control circuit of claim 7, further comprising:
controller means for providing control signals, said first switching means being under control of the controlling means;
first address counting means under control of the controlling means for providing in the first memory first write addresses for the odd field data corresponding to the first line, second write addresses for the even field data corresponding to the first line, and fourth addresses for the even field data corresponding to the second line; and
second address counting mans for providing in the first memory third write addresses for the odd field data corresponding to the second line.

9. The frame line memory control circuit of claim 8, further comprising:
first gating means under control of the controlling means for providing a first gate signal to the second memory in dependence upon a clock signal and said fourth pulse of the plurality of pulses of the horizontal synchronizing signal of said video signal.

10. The frame line memory control circuit of claim 9, further comprising:
read address counting means under control of the controlling means for providing read addresses in the first memory of the odd field data corresponding to the first line, the even field data corresponding to the first line, the odd field data corresponding to the second line, and the even field data corresponding to the second line;
second gating means under control of the controlling means for providing a second gate signal, said second gating means receiving said fourth pulse of the plurality of pulses of the horizontal synchronizing signal of said video signal; and
second switching means under control of the second gating signal for transferring to the first memory at least one of said read addresses, said first write addresses, said second write addresses, said third write addresses, and said fourth write addresses.

11. The frame line memory control circuit of claim 9, further comprising:
third switching means under control of the controlling means and the firs gating signal for transferring to the second switching means at least one of said first write addresses from the first write counting means, said second write addresses from the first write counting means, said third write addresses from the second write counting means, and said fourth write addresses from the first write counting means.

12. The frame line memory control circuit of claim 7, further comprising:
thermal print head processing means for processing video data stored in the first memory and the second memory for printing.

13. The method of claim 12 further comprising the steps of:
storing a next field to the field last stored in the first memory of the video data of the video signal into the second memory;

(a) reading the prior two fields stored into the first memory;
(b) storing said next field from the second memory to the first memory;
(c) storing a field following the next field into the first memory; and
repeating said steps of reading the prior two fields stored in to the first memory, storing said next field from the second memory to the first memory, storing a field following the next field into the first memory.

14. A method of controlling storage in a frame line memory control circuit of video data of a video signal, the method comprising the steps of:
storing a first field of the video data into a first memory;
storing a second field of the video data into a first memory;
storing a third field of the video data into a second memory;
reading the first and second field stored in the first memory;
storing the third field from the second memory into the first memory; and
storing a fourth field of the video data into the first memory.

15. A frame line memory control circuit for controlling storage of video data of a video signal, said circuit comprising:
first memory for storing a first field, a second field, a third field and a fourth field of said video data;
second memory for storing the third field prior to the third field being stored in the first memory;
first switching means for transferring said first field to the first memory, then transferring said second field to the first memory, then transferring said third field from the second memory to the first memory, then transferring said fourth field to the first memory, said transferring of the third field occurring during a read period of video data in the first memory.

16. A method for controlling storage in a frame line memory control circuit of video data of a video signal, said method comprising the steps of:
(a) writing video data of a first odd field of a first scan line into a first memory in accordance with a write address counter;
(b) writing video data of a first even field of first scan line into the first memory in accordance with the write address counter;
(c) writing, from a second memory into the first memory, video data of a first odd field of a second scan line during a fourth horizontal synchronous pulse occurring after beginning to transfer said video data of both the first odd field and first even field of the first scan line in accordance with a read address counter;

(d) writing video data of a first even field of a second scan line into the first memory in accordance with the write address counter;
(e) writing, from the second memory, video data of a first odd field of a third scan line during a fourth horizontal synchronous pulse occurring after beginning to transfer said video data of both the first odd field and first even field of the second scan line in accordance with the write address counter;
(f) writing video data of a first even field of a third scan line into the first memory in accordance with the write address counter; and
(g) repeating steps (e) and (f) for each next scan line of a single video screen.

17. A circuit storing received video data to be printed by video printing device, said circuit comprising:
memory means for generating frames of said received video data by combining odd fields of said received video data and even fields of said received video data in response to write addresses, and for reading out said frames as combined video data in response to read addresses;
latch means for temporarily storing said received video data during reading out of said frames of said combined video data, and for then providing the temporarily stored received video data to said memory means;
means for generating said write addresses; and
means for generating said read addresses.

18. A circuit as claimed in claim 17, wherein said write address generating means comprises:
a first write address counter for generating write addresses of said odd fields;
a second write address counter for generating write addresses of said even fields; and
first switching means for alternatively providing the even field write addresses and the odd field write addresses to said memory means.

19. A circuit as claimed in claim 17, further comprising:
second switching means for alternatively providing the even and odd field write addresses from the first and second write address counters and read addresses from said read address means.

20. A method for combining fields of video data into frames prior to printing by a video printing device, said method comprising:
storing received video data of a firs field into a memory;
storing received video data of a second field into said memory;
temporarily latching video data of a third field in a latch and simultaneously reading said first field and said second field as a frame of said video data for printing; and
transferring said video data of said third video from said latch to said memory.

* * * * *

UNITED STATES PATENT AND TRADEMARK OFFICE
CERTIFICATE OF CORRECTION

PATENT NO.     : 5,289,310
DATED          : Febuary 22, 1994
INVENTOR(S)    : Jung-Mok Park It is certified that error appears in the above-indentified patent and that said Letters Patent is hereby corrected as shown below:

IN THE DRAWINGS

FIG. 2,    Substitute the accompanying FIG. 2 for the drawing incorrectly printed in the originally issued patent.

(PRIOR ART)
*FIG. 2*

UNITED STATES PATENT AND TRADEMARK OFFICE
CERTIFICATE OF CORRECTION

PATENT NO. : 5,289,310
DATED : Febuary 22, 1994
INVENTOR(S) : Jung-Mok Park

It is certified that error appears in the above-indentified patent and that said Letters Patent is hereby corrected as shown below:

| | | |
|---|---|---|
| Column 6, | Line 67, | Change "mean" to --means-- ; |
| Column 7, | Line 14, | Preceding "thermal", Insert --a-- ; |
| | Line 28, | Change "wire" to --write-- ; |
| | Line 42, | Change "firs" to --first--, Change "at a" to --data-- ; |
| | Line 56, | Replace "din" with --d in-- ; |
| Column 8, | Line 18, | Change "mans" to --means-- ; |
| | Line 51, | Change "firs" to --first-- ; |
| Column 10, | Line 48, | Change "firs" to --first-- . |

Signed and Sealed this

Fifteenth Day of November, 1994

Attest:

BRUCE LEHMAN

Attesting Officer

Commissioner of Patents and Trademarks